United States Patent

[11] 3,585,488

[72] Inventors Hans-Joachim Gutt
 Nurnberg;
 Gerhard Ziegler, Ochenbruck, both of, Germany
[21] Appl. No. 761,177
[22] Filed Sept. 20, 1968
[45] Patented June 15, 1971
[73] Assignee Siemens Aktiengesellschaft
 Berlin and Munchen, Germany
[32] Priority Sept. 22, 1967
[33] Germany
[31] P 16 38 608.6

[54] METHOD OF OPERATING AN INVERTER
 14 Claims, 13 Drawing Figs.
[52] U.S. Cl. ................................................ 321/44, 321/18
[51] Int. Cl. ........................................... H02m 5/22
[50] Field of Search ........................................ 318/227, 231; 321/9 A, 16, 18, 43, 45

[56] References Cited
UNITED STATES PATENTS

| | | | |
|---|---|---|---|
| 3,226,630 | 12/1965 | Lampke | 321/9 A |
| 3,191,115 | 6/1965 | Lloyd | 321/16 X |
| 3,219,906 | 11/1965 | Keller et al. | 321/16 |
| 3,321,697 | 5/1967 | Etter | 321/45 |
| 3,349,312 | 10/1967 | Bergman | 321/16 X |
| 3,360,709 | 12/1967 | Etter | 321/45 X |
| 3,364,413 | 1/1968 | Abraham | 321/18 |
| 3,372,327 | 3/1968 | Morgan | 321/43 |
| 3,406,328 | 10/1968 | Studtmann | 321/45 |
| 3,418,557 | 12/1968 | Schaefer | 321/18 |
| 3,452,266 | 6/1969 | Borden et al. | 321/18 |

*Primary Examiner*—William M. Shoop, Jr.
*Attorneys*—Curt M. Avery, Arthur E. Wilfond, Herbert L. Lerner and Daniel J. Tick

ABSTRACT: A method of operating an inverter having a constant DC input voltage and an AC output voltage having a controlled fundamental frequency during pulse operation with voltage time integrals resulting in an approximately sinusoidal current curve and having a conductance dependent upon the output frequency and also having a switching component comprises delaying the switching of the switching component to its nonconductive condition thereby bridging the shortest or several short noncurrent intervals in a half-cycle of the output voltage when the fundamental frequency or the frequency of the AC output voltage or both are simultaneously increased. The shortest voltage time integral is bridged under the same circumstances. The switching of the switching component to its nonconductive condition is delayed thereby reinserting the noncurrent intervals when the fundamental frequency or the frequency of the AC output voltage or both are simultaneously decreased.

METHOD OF OPERATING AN INVERTER

DESCRIPTION OF THE INVENTION

The present invention relates to a method of operating an inverter. More particularly, the invention relates to a method of operating an inverter having a constant DC input voltage and an AC output voltage having a controlled fundamental frequency during pulse operation and a switching component, with an interval between the conductive and nonconductive condition of the switching component which is variable in duration. The output frequency is an approximately linear relation to the AC output voltage.

The inverter operated by the method of the present invention effects forced commutation of its switching components. The portion of the inverter which effects forced commutation of the switching components is connected to a source of DC voltage which may be provided by a storage battery or a rectifier connected to a three-phase power supply system. The connection to the source of DC voltage is via an inverter circuit having a generally variable AC output voltage.

Inverters of the type of the present invention are utilized advantageously in energizing speed-controlled driving devices for synchronous and nonsynchronous machines. The speed of the machine may be controlled by variation of the frequency and magnitude of the voltage of such machine. The magnitude of the fundamental frequency of the machine voltage may be varied by variation of the pulse operation during the half-cycles of the AC output voltage or by a variation in the DC input voltage of the inverter. A DC variable voltage source is thus required.

If the voltage of the machine is controlled by pulse operation, the voltage time integrals may be provided by an adjustment to a predetermined reference or datum value curve or by controlling the output magnitudes at a fixed interrelationship. Pulse frequency may thus be selected as a multiple of the output frequency. A disadvantage of voltage control by pulse operation occurs during operation at a high-output frequency, if the duration of the noncurrent intervals is in the order of magnitude of the nonconductive periods of the switching components of the inverter, which switching components are semiconductor controlled rectifiers or thyristors. The maximum frequency of the current conduction of the main switching components of the inverter is limited by the fact that the noncurrent intervals of switching components which are in their nonconductive condition cannot decrease below a determined limit value. The limit value is determined primarily by the nonconductive period of the switching components. The magnitude of the voltage time integrals is generally approximately constant. The duration of the individual voltage time integrals and the noncurrent intervals intermediate said integrals within a half-cycle of the AC output voltage may be determined by the conductive and nonconductive periods of the respective switching component. The voltage time integrals and the noncurrent intervals are preferably distributed in a manner whereby an approximately sinusoidal current curve is provided. This results in an approximately constant torque for the machine.

The principal object of the present invention is to provide a new and improved method of operating an inverter.

An object of the present invention is to provide a new and improved method of operating an inverter to control a switching component thereof.

An object of the present invention is to provide a method of operating an inverter which provides efficient, effective and reliable output voltage.

An object of the present invention is to provide a method of operating an inverter which produces a nonvibrating starting torque especially during difficult starting of a connected asynchronous machine.

In accordance with the present invention, the duration of the pulse frequency is in the order of magnitude of the rotary time constant of the asynchronous machine connected to the inverter circuit and at the same time the pulse frequency is limited when the frequency of the AC output voltage is increased. This provides a constant nonvibrating starting torque, especially when the asynchronous machine is difficult to start. At an increase in the fundamental frequency or in the frequency of the AC output voltage or both, the noncurrent interval of shortest duration in a half-cycle of the output voltage is bridged when the switching of the switching component to its nonconductive condition is delayed. If the fundamental frequency or the frequency of the AC output voltage or both decreases, the voltage time integral of shortest duration is bridged when the switching of the switching component to its nonconductive condition is delayed. On occasion, a plurality of successive noncurrent intervals or voltage time integrals are bridged. The noncurrent intervals or voltage time integrals may be bridged when their durations are at adjustable minimum values. The noncurrent intervals or voltage time integrals may be bridged stepwise predetermined values of the frequency of the output voltage. Limitation of the pulse frequency considerably increases the upper frequency limit of the inverter. Furthermore, an increase in the output frequency decreases the number of switching processes per cycle of the AC output voltage and results in improved utilization of the switching components and improved effectiveness of the inverter.

In order to bridge the noncurrent intervals when a predetermined minimum conductive period of the switching component is not provided, the corresponding minimum switching cycle for interrupting the supply of energy is eliminated. This is based upon the consideration that the minimum switching cycle has the least influence on the amplitude of the output voltage. A fully controlled inverter at its maximum frequency supplies a load with continuous, that is, nonpulsed voltage time integrals during a half-cycle. The substantially continuous transition between nonpulsed operation at a high output frequency and wholly pulsed operation at a low output frequency is due to the fact that the shortest noncurrent interval is gradually bridged or decreased due to the nonswitching of the switching component to its nonconductive condition.

In operations with difficult starting machines, at a starting frequency which is the same as the rated operating frequency of the machine such as, for example, 1 Hz., the required pulse frequency may amount to hundred times the fundamental frequency of the AC output voltage such as, for example, 100 Hz. When the angular velocity of the rotor of the machine increases, thereby increasing the frequency, the pulse frequency is correspondingly limited relative to the switching losses and the finite nonconductive period of the switching component. In the vicinity of the rated angular velocity, the rotating mass of the rotor of the machine has a sufficient smoothing effect on the pulsation of the torque.

When the fundamental frequency of the AC output voltage of the inverter increases while the machine increases in angular velocity from zero to the rated velocity, the pulse frequency may be gradually decreased at a whole multiple of the fundamental frequency, at various magnitudes of the output frequency, in a manner whereby its absolute amplitude does not exceed a predetermined limit. Utilizing the same steps, the output voltage may be adjusted so that the rated flux of the machine is maintained at an angular velocity and load condition, with very slight fluctuations such as, for example, within a range of slightly more than 3 percent. When the increasing output frequency reaches the value of the frequency step, two successive switching cycles of the same half-cycle of the output voltage are combined for a longer switching duration. The individual pulse durations may comprise a number greater than two and need not have the same duration.

In accordance with the present invention, an inverter is operated as follows. The inverter has a constant DC input voltage and an AC output voltage having a controlled fundamental frequency during pulse operation with voltage time integrals resulting in an approximately sinusoidal current curve and has a conductance dependent on the output frequency and a switching component having a conductive condition in which it conducts current and a nonconductive condition in which it prevents current conduction. The method of the present invention of operating an inverter comprises delaying the switching of the switching component to its nonconductive condition thereby bridging the shortest noncurrent interval in a half-cycle of the output voltage when the fundamental frequency or the frequency of the AC output voltage or both are simultaneously increased. The switching of the switching component to its conductive condition is delayed thereby bridging the shortest voltage time integral in a half-cycle of the output voltage when the fundamental frequency or the frequency of the AC output voltage or both are simultaneously increased. The switching of the switching component to its nonconductive condition is delayed thereby reinserting the noncurrent intervals when the fundamental frequency or the frequency of the AC output voltage or both are simultaneously decreased.

A plurality of successive noncurrent intervals of the voltage time integrals are bridged. The delay in switching of the switching component to its nonconductive condition bridges a plurality of successive noncurrent intervals when the duration of a noncurrent interval reaches an adjustable minimum value. The switching of the switching component to its nonconductive condition is permitted only when a noncurrent interval of longer than minimum duration is required. The voltage time integrals and the noncurrent intervals are so determined that the selected pulse frequency is a whole number multiple of the frequency of the AC output voltage.

A plurality of successive voltage time integrals are bridged stepwise at predetermined values of the output frequency. The inverter is connected to a rotary field machine and the output voltage is selected at predetermined values of the output frequency to produce a rated flux in the machine. At approximately the same magnitude of the output frequency the ratio of abrupt variation of the AC output voltage to its fundamental frequency remains approximately constant for the entire range of stepwise frequency variation. The ratio is less than 20:100 and may be less than 10:100 and is preferably about 6:100. The voltage time integrals and noncurrent intervals are varied in duration within the predetermined values. The correspondence of the frequency step to the values of the output voltage is varied in accordance with the load of the machine.

In order that the present invention may be readily carried into effect, it will now be described with reference to the accompanying drawings, wherein.

Figure 1:
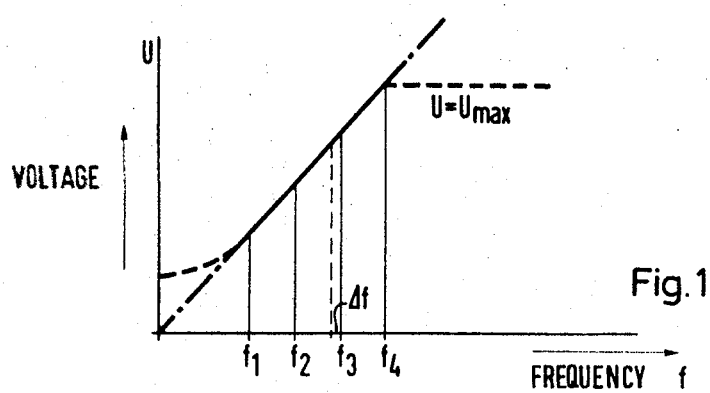
FIG. 1 is a graphical illustration of the frequency v. voltage characteristic of the inverter operated by the method of the present invention.

FIG. 1 illustrates the dependency of the voltage and frequency in energizing a rotating field machine over a relatively large range. At the lower frequencies the voltage deviates from linearity due to the ohmic resistances of the windings of the machine. In FIG. 1, the abscissa represents the frequency f and the ordinate represents the voltage U. The output frequency is to be continually varied up to the frequencies at which the field is weak and should thereby have the magnitudes $f_1, f_2, f_3$ and $f_4$.

Figure 2A:
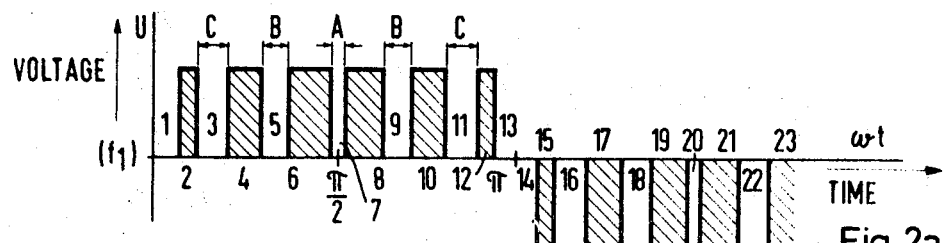
FIGS. 2a, 2b, 2c and 2d are graphical presentations illustrating the operation of the inverter operated by the method of the present invention.

In each of FIGS. 2a, 2b, 2c and 2d, the abscissa represents time $\omega t$, wherein $\omega$ is $2\pi f$, and the ordinate represents the voltage U. As shown in FIG. 2a, during the half-cycle of the AC output voltage, said voltage is divided into voltage time integrals at the frequency $f_1$. The duration of the voltage time integrals is selected via an appropriate selection of the instants at which the switching components are switched to their nonconductive condition in a manner whereby the corresponding machine current is of substantially sinusoidal configuration.

Figure 2B:
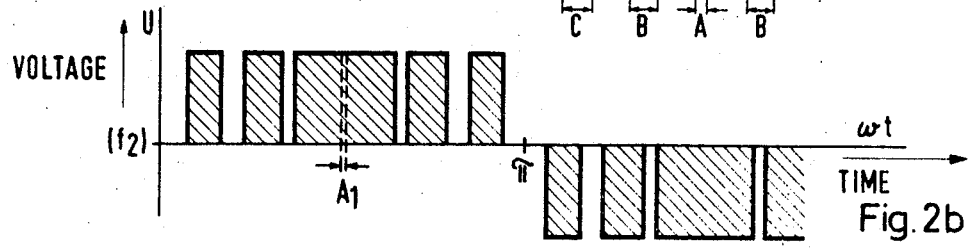

As shown in FIG. 2b, the fundamental oscillation of the voltage increases at the frequency $f_2$, which is greater than the frequency $f_1$. The increase of the fundamental oscillation of the voltage is due to the corresponding increase in the duration of the voltage time integral. The increase in duration of the voltage time integrals causes a noncurrent interval A of very small duration between two adjacent $\pi/2$ voltage time integrals 6 and 8. The noncurrent interval has a duration of about 100 microseconds at an inverter output voltage having a frequency of 50 Hz. or cycles per second. A duration of 100 microseconds is approximately one one-thousandth of the half-cycle duration. The noncurrent interval is bridged, eliminated or filled, in accordance with the present invention, by preventing the switching component or thyristor from being switched to its nonconductive condition.

Figure 2C:
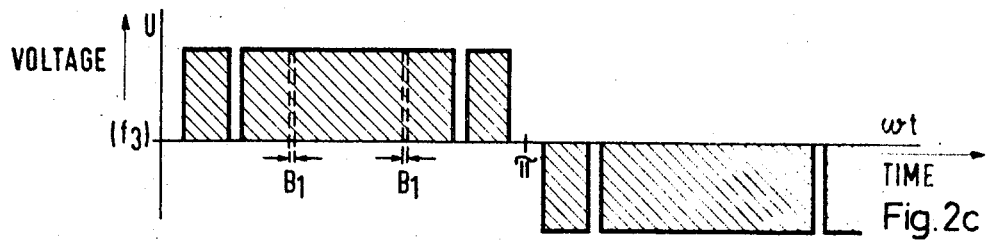

As illustrated in FIG. 2c, when the frequency is increased to $f_3$, the duration of the voltage time integrals 4, 6, 8 and 10 increases to such an extent that the two adjacent noncurrent intervals $B_1$ decrease to a point below the regulated value such as, for example, 100 microseconds, and would therefore also bridge the noncurrent intervals in the manner of the present invention.

Figure 2D:
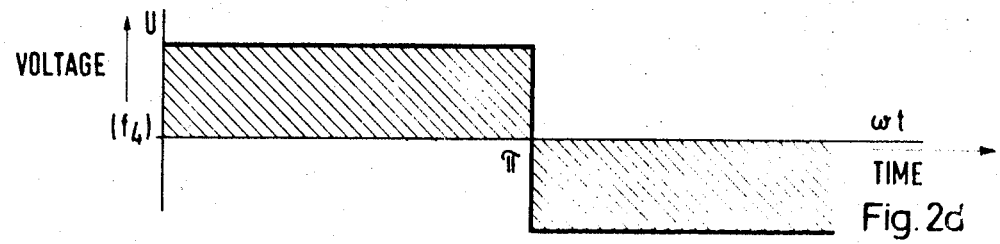

As shown in FIG. 2d, when the frequency increases to $f_4$, the last two noncurrent intervals are also bridged, eliminated or filled and the voltage time integral becomes a substantially continuous rectangular-shaped curve.

If the frequency decreases, the bridging of the noncurrent intervals ceases, in an opposite or reversed sequence, when the specified minimum period is exceeded. In a particularly preferred embodiment of the method of the present invention, the switching of the switching component to its nonconductive condition is prevented only when a lower frequency such as, for example, $f_3-\Delta f$ requires a longer noncurrent interval. The minimum value is preferably adjustable, as shown in FIG. 1. This method of operation prevents a rapid switching on and off of the switching components and thereby avoids "-pumping".

The variation of the frequency from $f_1$ to $f_4$, in a control operation, is preferably selected so that the pulse frequency $f_p$ of the voltage pulses is always a whole number multiple of the frequency $f_m$ of the AC output voltage of the machine. A preferred pulse frequency is $$f_p = (f_m) \cdot 3(2n+)$$

wherein $n$ is a whole number. Regulation or tuning of the machine and the pulse frequency in the foregoing manner may assist in avoiding surges or fluctuations and in providing symmetrical voltages at the windings of the machine.

Figure 3:
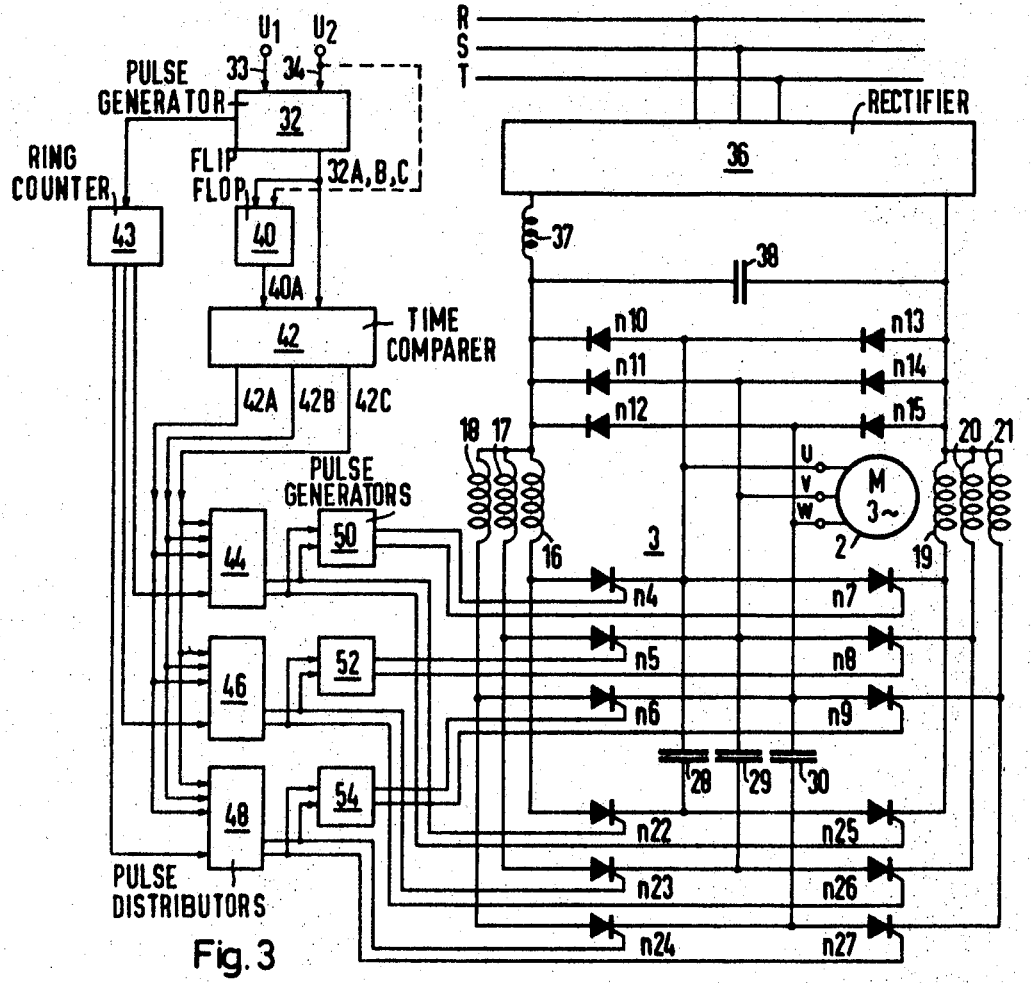
FIG. 3 is a combined circuit and block diagram of an embodiment of an inverter operated by the method of the present invention.

FIG. 3 is an embodiment of the inverter operated in accordance with the method of the present invention. In FIG. 3, a three-phase machine 2 is connected via an inverter 3 and various switching components to power supply lines or busses R, S and T. The switching components are connected in opposed polarity parallel connection, otherwise known as antiparallel connection. The switching components comprise a plurality of main thyristors n4, n5, n6, n7, n8 and n9 and a plurality of commutating, switching or blocking thyristors n22, n23, n24, n25, n26 and n27. A plurality of freewheeling diodes n10, n11, n12, n13, n14 and n15 are connected between the thyristors and the three-phase power lines R, S and T. A DC input circuit, which includes a filter or smoothing choke 37 and a filter or a smoothing capacitor 38 is connected between the diodes n10 to n15 and the power lines. A rectifier 36 is connected between the filter circuit 37, 38 and the power lines R, S and T.

The inverter 3 functions as an inverter when the machine 2 operates as a motor and as a rectifier when said machine operates as a generator. The average value of the output voltage of the inverter 3 may be varied, in accordance with the present invention, by pulse operation, so that said inverter may be connected to a source of constant DC input voltage such as a battery. The inverter 3 includes an arrangement for forced commutation of the output or load currents. The commutation arrangement includes a plurality of divided commutation reactors or chokes 16, 17, 18, 19, 20 and 21, the commutating thyristors $n22$, $n23$, $n24$, $n25$, $n26$ and $n27$ and three commutating capacitors 28, 29 and 30. The commutating thyristor $n22$ is connected in series with the main thyristor $n4$ via the commutating capacitor 28. The commutating thyristor $n23$ is connected in series with the main thyristor $n5$ via the commutating capacitor 29. The commutating thyristor $n24$ is connected in series with the main thyristor $n6$ via the commutating capacitor 30. The commutating thyristor $n25$ is connected in series with the main thyristor $n7$ via the commutating capacitor 28. The commutating thyristor $n26$ is connected in series with the main thyristor $n8$ via the commutating capacitor 29. The commutating thyristor $n27$ is connected in series with the main thyristor $n9$ via the commutating capacitor 30.

In order to commence operations, a charging arrangement (not shown in FIG. 3) is connected to and charges the commutating capacitors 28, 29 and 30 at a polarity which will switch the main thyristors $n4$ to $n9$ to their nonconductive condition. For charging purposes, the commutating capacitors 28, 29 and 30 may be connected with both DC terminals via high ohmic resistors of approximately 10 to 100 kilohms. The distribution of the commutating reactors 16 to 21, as shown in FIG. 3, causes decoupling of the commutating circuits. Thus, the voltage at one of the chokes can no longer be added to the voltage at the remaining main thyristors of the same circuit half during a commutating process of a specific main thyristor. The voltage in the DC intermediate circuit may therefore be selected at a relatively high magnitude and thereby permit the inverter 3 to be sufficiently utilized.

The inverter may be better utilized, particularly in operation at high frequencies, if the voltage time integral of the output voltage of said inverter is lengthened or increased. Due to the decoupling of the commutating circuits, a delay in switching the main thyristor to its conductive condition, following a commutation, is no longer necessary. The previously required nonconductive interval is therefore contained in the current conduction interval is therefore contained in the current conduction of the following main thyristor. The control circuit for the inverter is accordingly simplified.

Operation at higher frequencies is essentially facilitated due to the connection of the commutating reactors or chokes 16 to 21 in the freewheeling circuit of the selected commutator current. Immediately after one of the main thyristors $n4$ to $n9$ is switched to its nonconductive condition, the voltage of the commutating capacitor decreases at the choke which is connected in series with said main thyristor. This produces a voltage in the blocking direction of the nonconductive main thyristor such as, for example, the main thyristor $n4$. The voltage in the blocking direction is the same as the voltage at the choke such as, for example, the choke 16, and the threshold voltage of the corresponding freewheeling diode such as, for example, the diode $n10$, which provides a series connection of the main thyristor $n4$ to the corresponding choke 16. The nonconductive time of the main thyristor $n4$ is thereby considerably reduced.

A commutation process may involve the commutation of current in the main thyristor $n4$ to the freewheeling diode $n13$, for example. The main thyristors $n4$ and $n9$, and therefore also the leads to the input terminals U and W of the machine 2, should be conductive. The commutating thyristor $n22$ is switched to its conductive condition to initiate the commutating process. The commutating capacitor 28, prior to the commencement of the commutation process, is appropriately charged. Upon the switching of the commutating thyristor $n22$ to its conductive condition, the commutating capacitor 28 discharges via said thyristor and the main thyristor $n4$. During the discharge of the commutating capacitor 28, a current is built up and reduces the current in the main thyristor $n4$ to zero.

On the simple assumption that the current of the machine 2 does not vary during commutation, the discharge current of the capacitor 28 is supplied to said machine when the current in the main thyristor $n4$ decreases. When the current in the main thyristor $n4$ decreases to zero, the capacitor 28 continues to supply its discharge current to the machine 2 and the choke 16 and the commutating switching thyristor $n22$ are recharged via the freewheeling diode $n10$. Losses in the inverter, caused by damping, are compensated by the energy of the choke 16.

The commutating reactors or chokes 16 to 21 are so designed that they recharge the commutating capacitors 28, 29 and 30 during the conversion. As soon as the discharge current of the capacitor reaches the magnitude of the machine current, said discharge current is cut off by the freewheeling diode $n10$. The machine current flows through the freewheeling diode $n10$ when the capacitor current decreases. When the discharge current of the capacitor decreases, the freewheeling diode $n13$ conducts said current. As soon as the discharge current of the capacitor becomes zero, the entire machine current flows through the freewheeling diode $n13$.

The voltage at the terminals of the machine 2 must be controlled by the pulse operation of the main thyristors $n4$ to $n9$. This is achieved, in accordance with the present invention, by a control circuit comprising a pulse generator 32, a flip-flop 40, a time comparer 42, pulse distributors 44, 46 and 48 and pulse generators 50, 52 and 54. The pulse generator 32 produces pulses having a frequency which is preferably equal to a number of times the desired output frequency of the inverter. A DC control voltage $U_1$ is applied to the pulse generator via an input terminal 33. The magnitude of the DC control voltage $U_1$ determines the frequency of the pulses produced by the pulse generator 32.

The pulse generator 32 functions as a voltage-frequency transducer. The output pulses have a pulse frequency corresponding to the magnitude of the DC control voltage $U_1$. The DC control voltage $U_1$ may be considered to be the reference or datum value for the frequency. A DC control voltage $U_2$ is applied to the pulse generator 32 via another input terminal 34. The duration of the output pulses produced by the pulse generator 32 is determined by the magnitude of the DC control voltage $U_2$. The DC control voltage $U_2$ varies the average value of the voltage time integrals of the pulses produced by the pulse generator 32 and thereby determines the amplitude of the desired output voltage of the inverter 3. The operation of a pulse generator as a pulse duration modulator is known.

The pulses produced by the pulse generator 32 are directly supplied to a time comparer 42, a ring counter 43 and a flip-flop circuit 40 which is connected between said pulse generator and said time comparer. The time comparer 42 functions to determine whether a pulse produced by the pulse generator 32 has a duration which is longer or shorter than a reference pulse which is provided by the flip-flop circuit 40.

If the duration of the pulse produced by the pulse generator 32 is less or shorter than the duration of the reference pulse, the thyristors are prevented from being switched to their nonconductive condition. If the duration of the pulse produced by the pulse generator 32 is longer or greater than the duration of the reference pulse, the thyristors will be permitted to be switched to their nonconductive condition.

The reference pulse is determined by the set time of the flip-flop 40. As soon as the duration of the input pulse exceeds a variable predetermined time period, the flip-flop 40 produces a corresponding signal which is supplied to the corresponding input of the time comparer 42. The time comparer 42 includes a memory device which is operated as soon as the signal provided by the flip-flop 40 exceeds the signal supplied by the pulse generator 32 in duration.

When the output signal of the time comparer 42 is varied, a current-conducting main thyristor such as, for example, the main thyristor n4, is prevented from switching to its nonconductive condition. This is achieved by supplying a suitable signal to the pulse distributors 44, 46 and 48. Each of the pulse distributors 44, 46 and 48 comprises a circuit well known in the art, as does the time comparer 42, the flip-flop circuit 40 and the pulse generator 32. The ring counter 43 is connected to and controls the operation of each of the pulse distributors 44, 46 and 48.

The pulse distributors 44, 46 and 48 function to distribute the pulses in cycles to the individual switching components or thyristors. They may, therefore, include digital counting means. The pulse generators 50, 52 and 54 may comprise, for example, flip-flop circuits which supply pulses to the corresponding main thyristors n4 to n9. The switching pulses supplied to the main thyristors n4 to n9 by the pulse generators 50, 52 and 54 may be supplied, for example, by flip-flop circuits which supply pulses to the corresponding main thyristors n4 to n9. The switching pulses supplied to the main thyristors n4 to n9 by the firing pulse generators 50, 52 and 54 are provided at specific intervals. The intervals commence after the switching pulse for switching the corresponding commutating thyristor to its conductive condition and current in the main thyristor is reduced to zero.

The main thyristor n4 may be pulsed, as shown in FIG. 2a, during the first half-cycle of the output voltage of one of the phases of the inverter 3, for example. The main thyristor n7 may be pulsed during the following half-cycle of opposite polarity.

Figure 4:
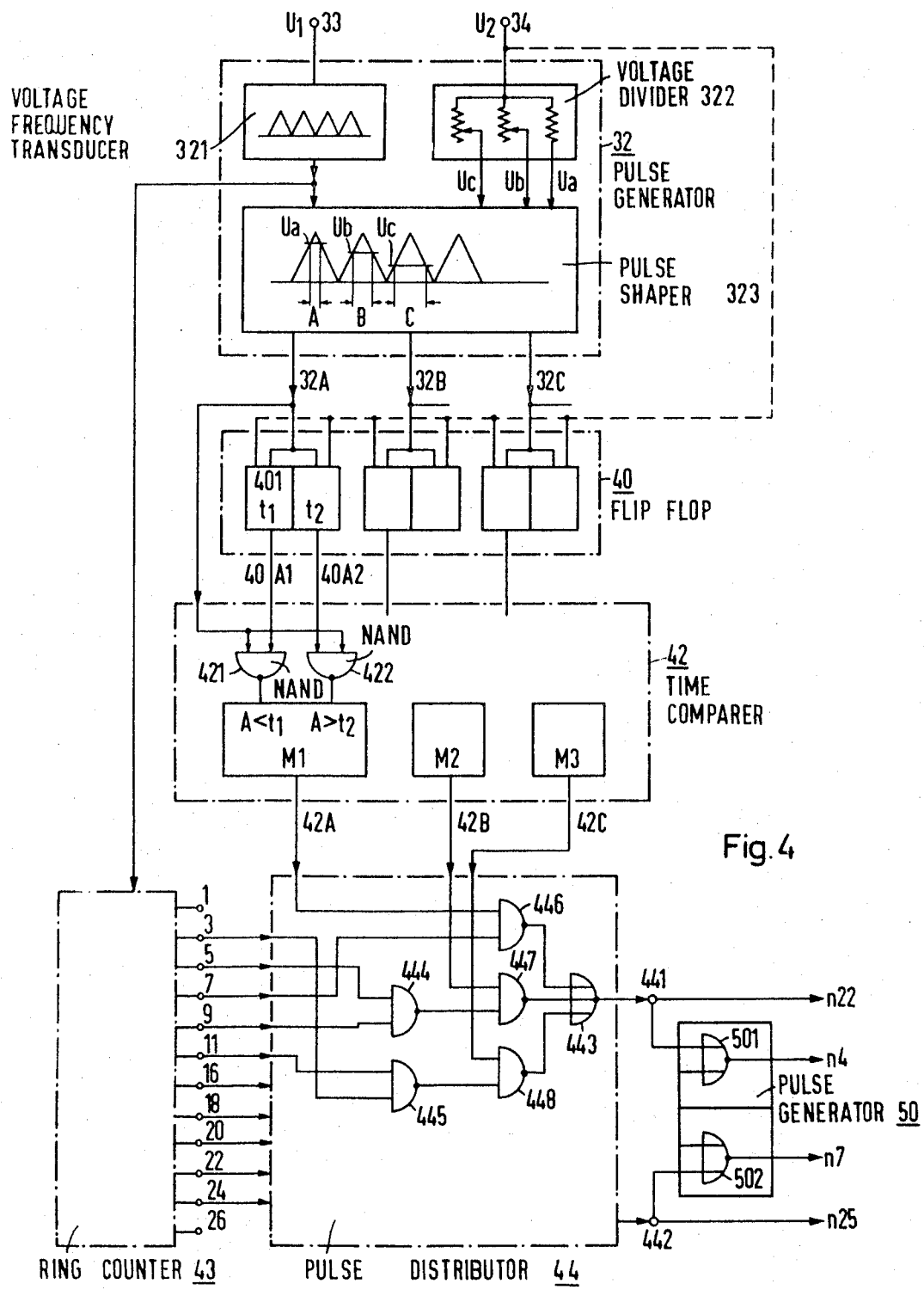
FIG. 4 is a combined circuit and block diagram of the blocks of the embodiment of FIG. 3.

As shown in FIG. 4, the pulse generator 32 includes a voltage-frequency transducer 321 which functions as a sawtooth wave generator or as a triangle voltage generator. Its mode of operation is known. A direct control voltage $U_1$ is applied to the input 33 of the transducer 321. The output of the transducer 321 comprises voltage pulses having a frequency proportional to the input voltage. The voltage-frequency transducer may comprise, for example, Model 9010 of Beckman Instruments of the United States.

Another direct control voltage $U_2$ is applied to a voltage divider 322. The voltage $U_2$ determines the duration of the noncurrent intervals shown in FIG. 2a and thereby also the average value of the output voltage of the inverter 3. To accomplish this, the output signal of the voltage-frequency transducer 321, as well as the signal converted at the voltage divider 322 into direct voltages of various magnitudes $U_a$, $U_b$ and $U_c$ (FIG. 4) are applied to a pulse shaper 323 of the pulse generator 32. The pulse shaper 323 functions as a limit value indicator in a known manner. The pulse shaper 323 may comprise, for example, Unit No. 458A2047A1 of Siemens AG of the Federal Republic of Germany.

The output voltages of the voltage divider 322 derived from the sawtooth waveforms of the transducer 321 appear as A at an output 32A, as B at an output 32B and as C at an output 32C. As hereinbefore mentioned, the duration of the pulses (in accordance with FIGS. 5a, 5b and 5c), may be adjusted in accordance with the control voltage $U_2$. The output signals of the pulse generator 32 are applied to the inputs of the flip-flop 40. The flip-flop 40 produces outputs 40A1 and 40A2, etc., at two firmly established times $t_1$ and $t_2$ (FIGS. 5b and 5c). The output signals 40A1 and 40A2 of the pulse generator 32 are applied to the inputs of NAND gates 421 and 422 of the time comparer 42. One input of each NAND gate is connected to the output of the corresponding state of the flip-flop 40 and the other input of each NAND gate is connected to the output of the pulse generator 32. The outputs of the NAND gates 421 and 422 are connected to the inputs of a memory gate M1, etc., of the time comparer 42.

Figure 5A:
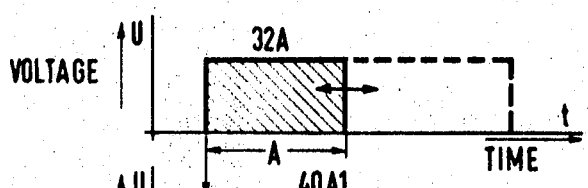
FIGS. 5a, 5b and 5c are graphical presentations illustrating the operation of the inverter of FIG. 3.
Figure 5B:
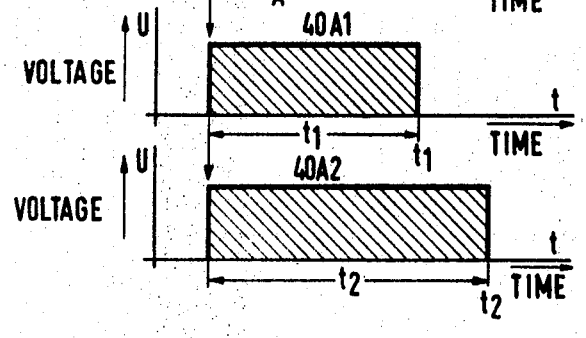
Figure 5C:

As shown in FIGS. 5a, 5b and 5c, the output signal 32A which has a duration which may be varied by the input voltage $U_2$, may be shorter, for example, than the output signal 40A1 or 40A2 of the flip-flop stage 401 of the flip-flop 40. As long as A is shorter than $t_1$ (FIGS. 5a and 5b), no output signal is provided at the output 42A of the time comparer 42, so that the thyristor which is then conductive is prevented from being switched to its nonconductive condition; that is, there is no quenching signal provided at output 441 of the pulse distributor 44.

In FIG. 4, the output signals 42A, 42B and 42C are applied to the pulse distributor 44. The pulse distributor 44 supplies a firing or switch-on pulse to the commutating thyristors n22 and n25, as soon as signal A is provided at the output 42A. Simultaneously, the respective counter number of the counter 43 such as, for example, 7 (FIG. 2a), corresponds to noncurrent interval A in the positive half-wave of the voltage U. This also applies to noncurrent interval B and the numbers 5 and 9 (FIG. 2a), as well as to noncurrent interval C and the numbers 3 and 11 (FIG. 2a).

The ring counter 43 is known and has a reverse position. A suitable counter 43 may comprise, for example, Unit No. 509/1 of Siemens AG of the Federal Republic of Germany. The output signals of the time comparer 42 and the output signals of the ring counter 43 are applied to a NOR gate 443 via NAND gates 444, 445, 446, 447 and 448 in the pulse distributor 44. The output 441 of the pulse distributor 44 therefore supplies a firing or switch-on pulse to the commutating thyristors n22 and n25, as soon as signals A, B or C are provided and coincide with the corresponding numbers indicated in FIG. 2a.

Firing or switch-on pulses for the main thyristors n4 or n7 are sometimes provided by the outputs 441 or 442 of the pulse distributor 44 as soon as the quenching signal disappears at the commencement of the hatched areas of FIGS. 2a, 2b and 2c. The control electrodes of the main thyristors n4 and n7 are therefore always connected to the outputs 441 and 442, respectively, of the pulse distributor 44 via inverters 501 and 502, respectively, of the firing pulse generator 50.

Figure 6:
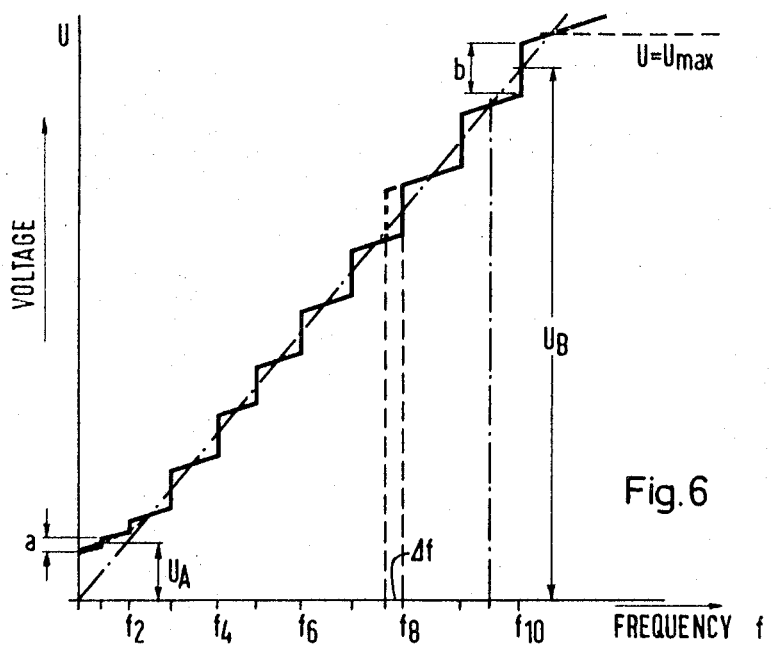
FIG. 6 is a graphical presentation of the frequency v. voltage characteristic of FIG. 1 in steps.

In FIG. 6, the broken dot-and-dash line illustrates the approximately linear dependence of the output voltage on the output frequency during the energization or operation of rotary field machines for a relatively large range of frequencies. In the lower frequency range, especially at standstill, there is, as described with reference to FIG. 1, a deviation from the linear relationship due to the electrical resistance of the machine windings. The abscissa represents the frequency $f$ and the ordinate represents the voltage U.

The pulse frequency is to be varied in steps or increments such as, for example, in 50 steps up to the range where the field is weak. FIG. 6 shows only 10 frequency step values $f_1$ to $f_{10}$ in order to maintain the clarity of illustration. In accordance with the present invention, the interval of the step frequency is preferably selected so that the relationship or ratio of the voltage variation $a$ in the increment $f_1$ to the magnitude $U_A$ of the voltage in said increment remains at least approximately the same in all the increments. The ratio of the voltage variation $b$ in the highest step or increment $f_{10}$ to the magnitude of the voltage $U_B$ in said increment is thus also equal to that in the step $f_1$. The values of the frequency steps may preferably be so selected that the voltage variation is not much higher than 20 percent of the voltage amplitude in the respective increment. The voltage variation is preferably not greater than 10 percent, and is preferably approximately 6 percent of the voltage amplitude.

For a stepwise variation of the pulse frequency, as shown in FIG. 6, the control voltage $U_2$ may, for example, be simultaneously applied to another input of the flip-flop 40, as shown by broken lines in FIGS. 3 and 4. This may simultaneously vary the duration of both output pulses $t_1$ and $t_2$ (FIGS. 5b and 5c).

A specially preferred additional embodiment of the method of the present invention is provided during the stepwise variation of the pulse frequency due to the prevention of the switching of the thyristors to their nonconductive condition being initially cancelled at a low-frequency range $f_8 - \Delta f$ (FIG. 6) if a longer or greater non-current interval is required. The duration of the non-current interval is preferably adjustable. This method eliminates repeated rapid switching on and off of the thyristors and thereby avoids "pumping".

Figure 7:
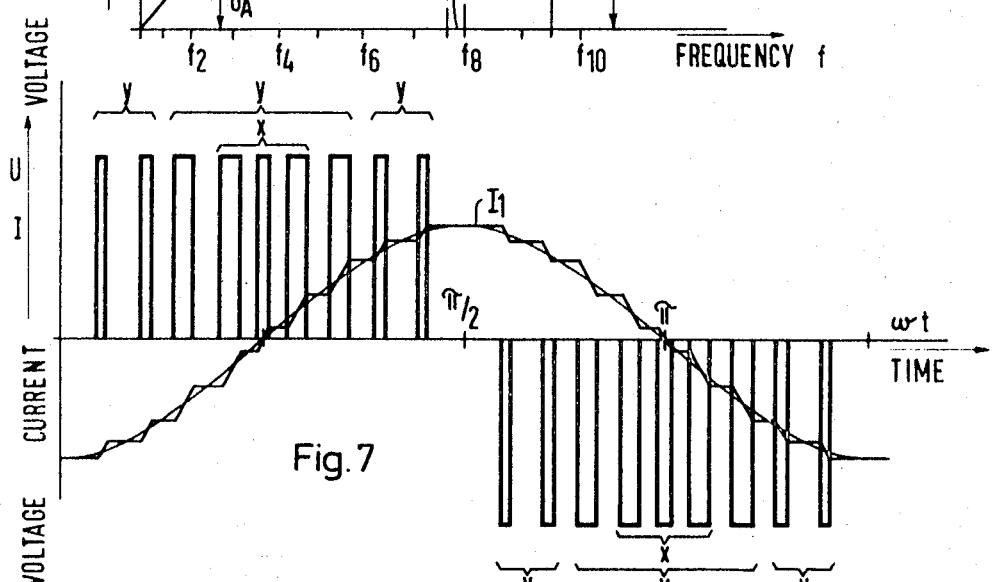
FIG. 7 is a graphical presentation of the variation in the voltage time integral.

In FIG. 7, the abscissa represents the time $\omega t$, where $\omega$ is $2\pi f$, and the ordinate represents the voltage U and the current I. The voltage time integrals are plotted at a greater pulse frequency, which should be a frequency increment as in FIG. 6, in FIG. 7. The distribution of the voltage time integrals over a half-cycle period of the output voltage is selected so that the fundamental frequency of the current $I_1$ is approximately sinusoidal. At a pulse frequency corresponding to 100 times the output frequency, 100 voltage time integrals are produced, for example, in a cycle of the output voltage. FIG. 7 illustrates only 9 of the voltage time integrals, in order to maintain the clarity of illustration. The illustration of FIG. 7 thus corresponds approximately to the voltage time integrals in the frequency range $f_8$ of FIG. 6.

Figure 8:
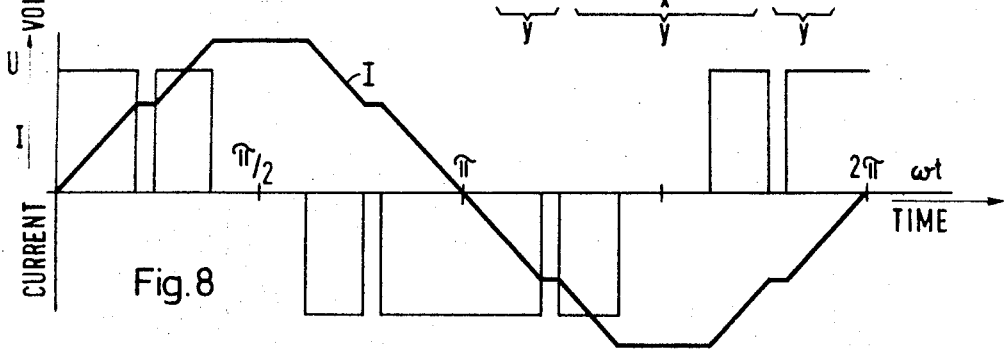
FIG. 8 is a graphical presentation of the variation in the voltage time integral.

In FIG. 8, the abscissa represents the time $\omega t$, where $\omega$ is $2\pi f$, and the ordinate represents the voltage U and current I. FIG. 8 illustrates the combining of voltage time integrals by bridging the noncurrent intervals. In another frequency step or increment, these are the voltage time integrals x (FIG. 7) and in the following frequency step or increment they are the voltage time integrals y (FIG. 7). The average value of each voltage half-cycle is provided in a frequency increment or step of FIG. 8 from 3 voltage time integrals. The current is thus approximately trapezoidal in waveform. If the voltage time integrals are also combined in the last frequency steps, then each half-cycle of the output voltage includes a 180° linear portion and the current would thus be in triangular waveform.

During the continuous increase of the output frequency, for example, from the frequency $f_1$ to the frequency $f_2$, in which other switching cycles are combined, the duration of the voltage time integrals may also be continuously varied. This considerably reduces the voltage variations and, therefore, the deviation from the rated flux of the machine.

The number of frequency values or increments $f_1$ to $f_{10}$ of FIG. 6 may be kept low, in accordance with the present invention, by permitting, even within the values of the steps, the variation of the voltage time integrals within a half period of the output frequency or the variation of the duration of the noncurrent intervals. This results in an inclination or sloping of the characteristic line between the individual frequency values $f_1$ and $f_{10}$, as shown in FIG. 6.

When a connected machine is heavily loaded, the voltage drops in the machine windings may be compensated for the purpose of maintaining the rated flux of the machine. The compensation may be accomplished by increasing the output voltage of a determined frequency by combining the switching cycles intended only for the next succeeding frequency value.

If, at an assumed frequency, the output voltage is to be decreased below its idling value, in case of a disturbance, for example, during a short circuit, several noncurrent intervals could be combined in a sequence which is also determined by the control. This feature is based on the recognition that the nonconductive time of the thyristors permits the decrease of the output voltage only up to a limit. Such decrease of the output voltage may be accomplished by anticipating the dissolution of the combined voltage time integrals intended only for the lower frequency increments.

The embodiment example illustrates the bridging of the shortest noncurrent interval when the average values of the half-cycles of the output voltage are increased. Similarly, when the frequency of the output voltage is decreased, the voltage time integrals of a short duration may be bridged by delaying the switching of the nonconductive thyristor to its conductive condition.

While the invention has been described by means of a specific example and in a specific embodiment, we do not wish to be limited thereto for obvious modifications will occur to those skilled in the art without departing from the spirit and scope of the invention.

We claim:

1. A method of operating an inverter having a constant DC input voltage and an AC output voltage having a controlled fundamental frequency during pulse operation with voltage time integrals resulting in an approximately sinusoidal current curve, and having a conductance dependent on the output frequency and having a switching component having a conductive condition in which it conducts current and a nonconductive condition in which it prevents current conduction, said method comprising
preventing the operation of the switching component so that said switching component is prevented from being changed to its nonconductive condition thereby bridging the shortest noncurrent interval in a half-cycle of the output voltage when the duration of the noncurrent interval decreases to less than a predetermined magnitude.

2. A method as claimed in claim 1, wherein a plurality of successive noncurrent intervals of the voltage time integrals are bridged.

3. A method as claimed in claim 1, wherein preventing the operation of the switching component so that said switching component is prevented from being changed to its nonconductive condition bridges a plurality of successive noncurrent intervals when the duration of a noncurrent interval reaches an adjustable minimum value.

4. A method as claimed in claim 1, wherein the voltage time integrals and the noncurrent intervals are so determined that the selected pulse frequency is a whole number multiple of the frequency of the AC output voltage.

5. A method as claimed in claim 1, wherein a plurality of successive voltage time integrals are bridged stepwise at predetermined values of the output frequency.

6. A method as claimed in claim 1, wherein the inverter is connected to a rotary field machine and the output voltage is selected at predetermined values of the output frequency to produce a rated flux in the machine.

7. A method as claimed in claim 3, wherein the switching of the switching component to its nonconductive condition is permitted only when a noncurrent interval of longer than minimum duration is required.

8. A method as claimed in claim 5, wherein at approximately the same magnitudes of the output frequency the ratio of abrupt variation of the AC output voltage to its fundamental frequency remains approximately constant for the entire range of stepwise frequency variation.

9. A method as claimed in claim 5, wherein the voltage time integrals and noncurrent intervals are varied in duration within the predetermined values.

10. A method as claimed in claim 6, wherein the correspondence of the frequency steps to the values of the output voltage is varied in accordance with the load of the machine.

11. A method as claimed in claim 8, wherein the ratio is less than 20:100.

12. A method as claimed in claim 8, wherein the ratio is less than 10:100.

13. A method as claimed in claim 8, wherein the ratio is about 6:100.

14. An inverter system comprising an inverter network having a constant DC input voltage circuit and an AC output voltage circuit having a controlled fundamental frequency during pulse operation with voltage time integrals resulting in an approximately sinusoidal current curve, said network having a conductance dependent on the output frequency and comprising a switching component having a conductive condition and a nonconductive condition, said inverter system comprising pulse-shaping means for producing a quenching pulse for changing said switching component to its nonconductive condition; time-comparing means coupled to said pulse-shaping means for comparing said quenching pulse in duration to a predetermined reference time interval; and suppressing means coupled to said time-comparing means for preventing the application of said quenching pulse to said switching component as long as the duration of said quenching pulse is less than said reference time interval.